United States Patent
Ahn

(10) Patent No.: US 8,185,436 B2
(45) Date of Patent: May 22, 2012

(54) APPARATUS AND METHOD FOR ADVERTISING IN DIGITAL PHOTO FRAME

(76) Inventor: Hojin Ahn, San Jose, CA (US)

( * ) Notice: Subject to any disclaimer, the term of this patent is extended or adjusted under 35 U.S.C. 154(b) by 1031 days.

(21) Appl. No.: 12/036,101

(22) Filed: Feb. 22, 2008

(65) Prior Publication Data
US 2009/0216631 A1    Aug. 27, 2009

(51) Int. Cl.
*G06Q 30/00* (2006.01)
(52) U.S. Cl. .................................. 705/14.69
(58) Field of Classification Search ...... 705/14.1–14.73, 705/35–45
See application file for complete search history.

(56) References Cited

U.S. PATENT DOCUMENTS

| | | | |
|---|---|---|---|
| 7,098,870 B2 * | 8/2006 | Wampler et al. | 345/2.1 |
| 7,895,088 B2 * | 2/2011 | Hunter | 705/27.2 |
| 2005/0057578 A1 | 3/2005 | Chen et al. | |
| 2005/0162555 A1 | 7/2005 | Lan et al. | |
| 2006/0085283 A1 * | 4/2006 | Griffiths | 705/26 |
| 2007/0081643 A1 * | 4/2007 | Divine | 379/100.01 |
| 2007/0136134 A1 * | 6/2007 | Moscovitch | 705/14 |
| 2007/0150916 A1 * | 6/2007 | Begole et al. | 725/10 |
| 2007/0255618 A1 * | 11/2007 | Meerbergen et al. | 705/14 |
| 2008/0129646 A1 * | 6/2008 | Bhavnani | 345/1.1 |
| 2008/0134043 A1 * | 6/2008 | Georgis et al. | 715/733 |
| 2008/0275784 A1 * | 11/2008 | Kramer et al. | 705/14 |
| 2009/0171970 A1 * | 7/2009 | Keefe | 707/10 |
| 2009/0182800 A1 * | 7/2009 | Lin et al. | 709/201 |
| 2009/0234723 A1 * | 9/2009 | Grevell | 705/14 |

OTHER PUBLICATIONS

Smith, Kevin, "Pumped up over ad venture", San Gabriel Valley Tribune. West Covina, Calif: Jul. 27, 2007, pp. 1-2.*
"Photo Vu ™ Expands Product Line with 17" Widescreen Wireless Digital Picture Frame", PR NEWSIRE (US), Nov. 15, 2007, pp. 1-2.*
Kharif, Olga, "Reframing Digital Entertainment", Business Week (Online). New York: Feb 1, 2008, p. 1.*
"Digital Photo Frames Find New Purpose", Canada Newswire. Ottawa: Jan 13, 2008. p. 1.*

* cited by examiner

*Primary Examiner* — Ella Colbert
*Assistant Examiner* — Mohammad Z Shaikh
(74) *Attorney, Agent, or Firm* — Invent Capture, LLC.; Samuel S. Cho

(57) ABSTRACT

A novel digital photo frame is configured to display user-loaded photographs, moving pictures, and other personal data and corporate-paid advertisements which are dynamically updatable by an advertising data distribution center or another communications service provider, such as a cellular service provider. The invention also discloses a related, novel method of advertising in a digital photo frame with dynamically-updatable-ads, in which initial advertising fees for one or more dynamically-updateable ads at least partially pay for manufacturing costs of the digital photo frame for inexpensive distribution of the digital photo frame to a targeted consumer.

4 Claims, 7 Drawing Sheets

APPARATUS AND METHOD FOR ADVERTISING IN DIGITAL PHOTO FRAME

BACKGROUND

Digital photo frames capable of displaying digital image or moving picture files are becoming increasingly popular in households as they gradually replace or complement conventional photo frames which encapsulate a paper-printed photograph. Most digital photo frames use liquid crystal display (LCD) panels, plasma display panels, or organic light emitting diode (OLED) panels to display a slideshow of digital images or moving pictures.

Conventional digital photo frames typically have input/output port such as USB, IEEE1394, or other data transfer-capable means to upload or download digital data. The digital data transferred between a digital photo frame and another electronic device can be stationary images, moving pictures, or any other digital (e.g. binary-based) data such as MP3 audio files which may have some utility in several applications typically available on a digital photo frame. Some digital photo frames are even capable of utilizing wireless local area networks such as IEEE 802.11-based wireless transfer protocols to connect to a home gateway or a computer.

Nevertheless, household digital photo frames are not currently used or even imagined to be used for advertising purposes. Although television, radio, and internet-enabled computers provide means of both broad and focused advertisements to consumers, they are not as readily accessible, repetitive, or visible to a consumer as a household digital photo frame, which typically serves as a prominent ornamental fixture in a living room, a dining room, a bedroom, or a study.

The potential commercial impact of advertising on digital photo frames is significant, especially when the cost of manufacturing a digital photo frame falls to a point of high profitability for advertising entities utilizing a network of digital photo frames. Therefore, a method and an apparatus for advertising in a digital photo frame can be highly lucrative and useful for advertisers.

SUMMARY

A digital photo frame is configured to display one or more user-loaded photographs and/or one or more advertisements, the digital photo frame comprising a power control and supply unit configured to supply electrical power to the digital photo frame, wherein the power control and supply unit is optionally operatively connected to a battery or an external electrical outlet, a display driver and a display-related circuitry inside the digital photo frame, wherein the display driver and the display-related circuitry are configured to generate a stationary or moving image on a display panel of the digital photo frame, an input/output port unit configured to receive incoming data into the digital photo frame or transmit outgoing data out of the digital photo frame, wherein the input/output port unit can be either a wired port, a wireless port, or a combined wired/wireless port, a central processing unit operatively connected to a memory unit, a system control unit, the power control and supply unit, the display driver and the display-related circuitry, and/or the input/output port unit, wherein the central processing unit is configured to provide necessary computations and controls for an operation of the digital photo frame, and an advertising-update unit, wherein the advertising-update unit is configured to create, update, replace, or modify the one or more advertisements based on an incoming advertisement data transmission from a remote advertisement data distribution center.

Moreover, a method of advertising on a digital photo frame with dynamically-updatable-ads comprises recruiting a company wanting to place an advertisement in the digital photo frame, wherein the advertisement is configured to present stationary digital photographs, a group of moving pictures, and/or aural information, collecting initial advertisement fees from the company, wherein the initial advertisement fees at least partially cover a cost of manufacturing and/or distribution cost of the digital photo frame, loading the digital photo frame with the advertisement for the company, wherein the advertisement is dynamically updatable by a remote advertising data distribution center, distributing the digital photo frame to a targeted customer who is considered to be a potential purchaser of a service or a product advertised by the company in the digital photo frame, and updating the advertisement in the photo frame periodically via the remote advertising data distribution center.

Furthermore, an advertisement distribution network using digital photo frames is configured to display both user-loaded photographs and advertisements, the advertisement distribution network comprising a first set of digital photo frames configured to display a first set of advertising materials transmitted by an advertising data distribution center, wherein each digital photo frame in the first set of digital photo frames is configured to display personal photograph slides of each user intertwined with the first set of advertising materials, a second set of digital photo frames configured to display a second set of advertising materials transmitted by the advertising data distribution center, wherein each digital photo frame in the second set of digital photo frames is configured to display personal photograph slides of each user intertwined with the second set of advertising materials, and the advertising data distribution center configured to receive a variety of advertising materials from an advertising agency, a company, or a marketer, wherein at least some portion of the variety of advertising materials are eventually transmitted to some digital photo frames.

DETAILED DESCRIPTION

Figure 1:
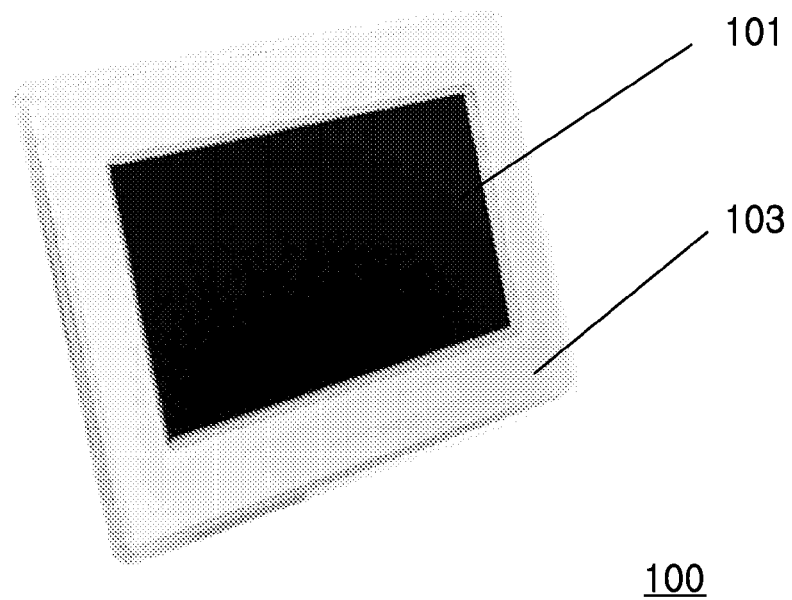
FIG. 1 shows a front portion of a digital photo frame in accordance with an embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to digital photo frames and methods of using digital photo frames. More specifically, an embodiment of the invention relate to a digital photo frame configured to display one or more user-loaded photographs and/or one or more advertisements which are dynamically updatable via an advertising data distribution center or another communications service provider, such as a cellular service provider. Another embodiment of the invention relate to a business method of advertising in a digital photo frame with dynamically-updatable ads, in which initial advertising fees for one or more dynamically-updateable ads at least partially pay for manufacturing costs of the digital photo frame for inexpensive distribution of the digital photo frame to a targeted consumer. Yet another embodiment of the invention relate to an advertisement distribution network using digital photo frames which can display both user-loaded photographs and advertisements, wherein the advertisements can be updated dynamically via an advertising distribution center.

Furthermore, one objective of the invention is to provide a lucrative way to conduct either broad or focused advertising campaign on a plurality of digital photo frames, wherein the plurality of digital photo frames are intentionally distributed at no cost or low cost to consumers because initial advertising fees for pre-loaded advertisements in the plurality of digital photo frames at least partially pay for the cost of manufacturing the plurality of digital photo frames. A further objective of the invention is to proliferate digital photo frames with dynamic advertising capability to consumers inexpensively, which allows consumers to enjoy viewing their personal digital photographs or moving pictures while checking out new products or services advertised periodically in the digital photo frames. Yet another objective of the invention is to let a cellular service provider to act as an advertising data distribution center for updating advertisements in individual digital photo frames, or act as a gateway to the Internet and e-commerce for digital photo frames if they are designed to handle e-commerce transactions.

FIG. 1 shows a front portion of a digital photo frame (100) in accordance with an embodiment of the invention. Like most commercially-available digital photo frames in the market today, this particular digital photo frame (100) has a display panel (101) and an exterior frame (103) which surrounds the display panel (101) for a high level of impact protection and aesthetics. The display panel (101) is a viewing area of digital photographs or moving pictures uploaded to the digital photo frame (100). The display panel (101) is typically a liquid crystal display (LCD) panel or a plasma display panel. Some digital photo frames employ an increasingly popular display technology called "Organic Light Emitting Diode," or OLED technology which does not require backlighting, thereby achieving energy savings and thinner panel thickness.

Digital photo frames in the market today have varying display panel sizes, with a typical panel diagonal width of 5 to 10 inches per frame. In one embodiment of the invention, as the cost of manufacturing digital photo frames get cheaper, a benefit/cost ratio of employing dynamic ally-updatable advertisements in household photo frames becomes attractive enough to distribute the household photo frames at no cost to potential consumers. In this particular embodiment of the invention, the potential consumers of products or services can generally use the freely-distributed digital photo frames for displaying personal digital photographs or moving pictures, but the dynamically-updatable advertisements are placed in regular intervals or random intervals between the personal digital photographs or moving pictures. Continuing with the particular embodiment of the invention discussed above, the dynamically-updatable advertisements themselves can be a series of stationary photographs and/or moving pictures with optional sound effects.

Figure 2:
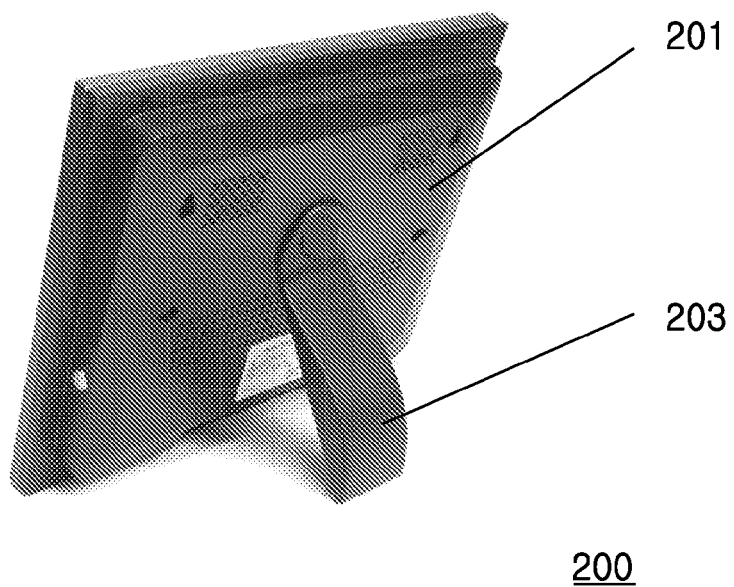
FIG. 2 shows a rear portion of a digital photo frame in accordance with an embodiment of the invention.

FIG. 2 shows a rear portion of a digital photo frame (200) in accordance with an embodiment of the invention. Like most commercially-available digital photo frames in the market today, this particular digital photo frame (200) has a rear display panel cover (201), typically made of plastic, and a digital photo frame pedestal (203), also typically made of plastic, which enables the digital photo frame (200) stand relatively upright and additionally provide some design aesthetics. In one embodiment of the invention, the digital photo frame pedestal (203) is configured to swivel at least 90 degrees around a pivot point to make the digital photo frame (200) stand up in either a "portrait" mode or a "landscape" mode. In one embodiment of the invention, the digital photo frame (200) contains a rechargeable battery inside the rear display panel cover (201) to provide a cordless viewing of digital photographs and moving pictures while generating desirable sound effects during a slideshow or a multimedia mode defined by the digital photo frame (200).

Figure 3:
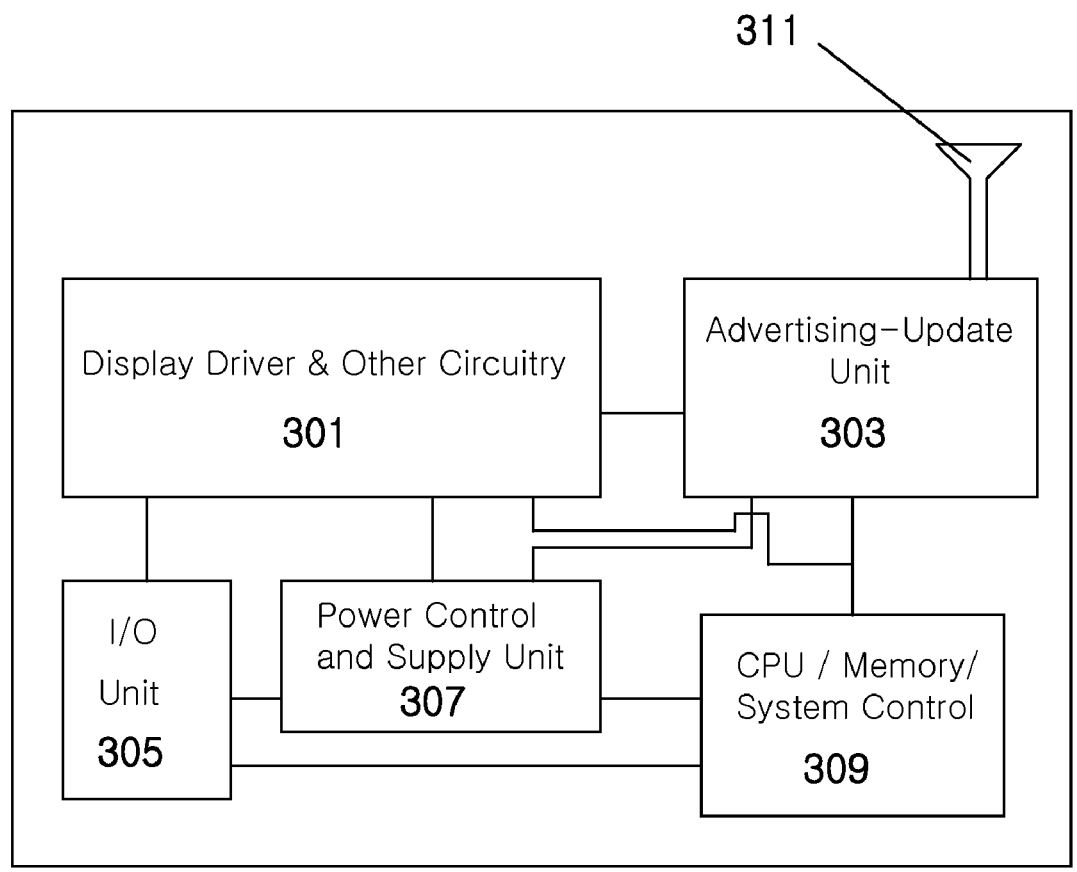
FIG. 3 shows a logical functional block diagram for a digital photo frame in accordance with an embodiment of the invention.

FIG. 3 shows a logical functional block diagram (300) for a digital photo frame in accordance with an embodiment of the invention. In one embodiment of the invention, a power control and supply unit (307) supplies electrical power to the digital photo frame. Optionally, the power control and supply unit (307) is connected to a battery or an external electrical outlet. In one embodiment of the invention, a display driver and a display-related circuitry (301) generates a stationary or moving image on a display panel of the digital photo frame based on data provided by a system memory unit controlled by a central processing unit (309) or the central processing unit (309) itself. In another embodiment of the invention, the display driver and the display-related circuitry (301) receives necessary data for the display panel from a dedicated graphics/display chip unit.

The logical functional block diagram (300) for the digital photo frame shown in FIG. 3 also has an input/output port unit (305), which is designed to receive incoming data into the digital photo frame or transmit outgoing data out of the digital photo frame. The input/output port unit (305) can be either a wired port, a wireless port, or a combined wired/wireless port. In one embodiment of the invention, the input/output port unit (305) incorporates a universal serial bus, or USB standard as a wired bidirectional port. In another embodiment of the invention, the input/output port unit (305) incorporates a "WiLAN" or IEEE 802.11 protocol standard as a wireless bi-directional port. Yet in another embodiment of the invention, the input/output port unit (305) can utilize a satellite communications technology or a cellular communications technology.

Continuing with FIG. 3, a central processing unit (CPU) is contained in a same logical block (309) as the memory unit and optionally a system control unit.

It should be noted that the CPU does not have to be contained in the same logical block (309) as the memory unit and/or the system control unit for the present invention. In one embodiment of the invention, the CPU/memory/system control logical block (309) is designed to provide necessary computations and controls for an operation of the digital photo frame. In one embodiment of the invention, the CPU/memory/system control logical block (309) is operatively connected to all other logical blocks in the logical functional block diagram (300), including the power control and supply unit (307), the display driver and the driver-related circuitry (301), the input/output port unit (305), and an advertising-update unit (303).

The memory unit of the CPU/memory/system control logical block (309) can be further extended by an outside volatile or non-volatile memory, such as a flash drive which may be operatively connected to the input/output port unit (305). The outside non-volatile memory can store personal digital photographs, moving pictures, or other useful data, and upload any desired data to the digital photo frame.

Continuing with FIG. 3, the advertising-update unit (303) can create, update, replace, or modify one or more advertisements based on an incoming advertisement data transmission from a remote advertisement data distribution center. In one embodiment of the invention, the advertising-update unit (303) comprises a remote wireless transceiver based on a wireless local area network technology (WiLAN), a cellular network technology, or a satellite-based communications technology. If the advertising-update unit itself is part of the remote wireless transceiver, then an antenna (311) may be operatively connected to the advertising-update unit. In another embodiment of the invention, the advertising-update unit (303) is simply a software program or a passive processing block which receives advertising-update data from the existing input/output port unit (305) of a digital photo frame to update at least a portion of existing advertisements in the digital photo frame. If the advertising-update unit (303) does not have a necessary internal memory to store newly updated advertisements, the received advertising-update data may be at least partially stored in the memory unit of the CPU/memory/system control logical block (309).

If the advertising-update unit (303) utilizes a cellular service provider to receive the advertising-update data, a cellular phone number can be assigned to a particular digital photo frame in accordance with the invention as a unique photo frame identifier. This unique photo frame identifier can be used to provide additional cellular network data and Internet services, such as text-messaging, emailing, and enabling e-commerce transaction of a product or a service advertised by the particular digital photo frame.

As the cost of manufacturing a household photo frame erodes rapidly in the future, the cost/benefit ratio of distributing a plurality of household digital photo frames to potential buyers of products and services advertised in the plurality of household digital photo frames will become very attractive. Unlike time-slot based television or radio advertisements, an advertisement placed in a household digital photo frame can exhibit higher repeatability, interactivity, and visibility for a particular advertisement that a sponsoring company wants to accentuate without incurring additional advertising costs. A TV ad spot typically has a defined cost and repeating the TV ad spot many times by the sponsoring company can become prohibitively expensive. Equally important, TV or Radio ad spots are more effective in reaching broad consumer market segments and are not particularly useful in focused or niche market segments. In contrast, a digital photo frame with dynamic-ad-update capability, as embodied by the present invention, can target both focused or niche market segments and broader market segments. For example, if an advertiser knows that a particular photo frame, identified by a serial number or a cellular phone number assigned to the particular photo frame, is held by a 35-year-old single female who most likely placed the particular photo frame in her bedroom, the advertiser can transmit a niche-market advertisement (e.g. a female skin care lotion) to the particular photo frame. In one embodiment of the invention, this niche-market advertisement transmitted by the advertiser automatically replaces an existing advertisement by the same advertiser, while retaining all of the personal photographs, moving pictures, and other relevant personal data utilized by a photo frame user. Furthermore, in one example of this embodiment of the invention, the niche-market advertisement can have a predefined advertisement life of one month, after which point a new advertisement will be downloaded to the particular photo frame.

The present invention also has distinct advantages over existing advertisement strategies over the World Wide Web on the Internet. A majority of Internet advertisements are either pegged to a particular website or search-term sensitive. Therefore, the visibility and the accessibility of Internet advertisements are highly limited by how an Internet user navigates the World Wide Web. In contrast, dynamically-updatable advertisements on a household photo frame is readily accessible and visible (e.g. on top of a beloved furniture or a highly-visible location at home). Furthermore, a photo frame operatively connected to the Internet by a wireless communication service provider (e.g. a cellular service provider) can even complete e-commerce transactions on the fly without requiring a separate electronic device, if the photo frame incorporates necessary user interface functions to enable a completion of an e-commerce transaction. Therefore, the invention has clear and distinct advantages over conventional advertising media, which include TV, radio, and the computer-accessed Internet.

Figure 4:
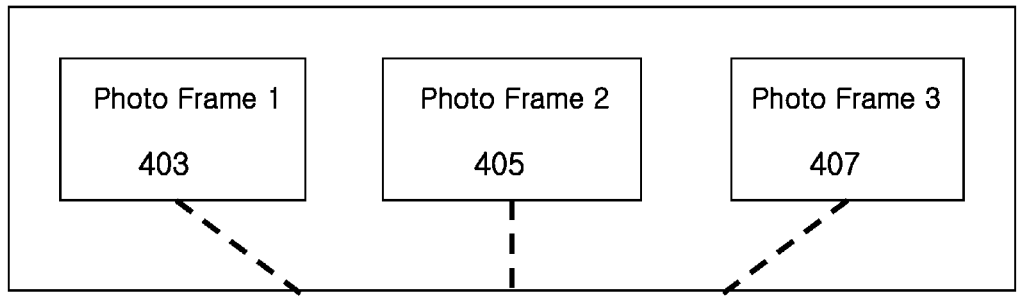
FIG. 4 shows a first advertisement distribution network using a plurality of digital photo frames and an advertising data distribution center in accordance with an embodiment of the invention.
Figure 4:
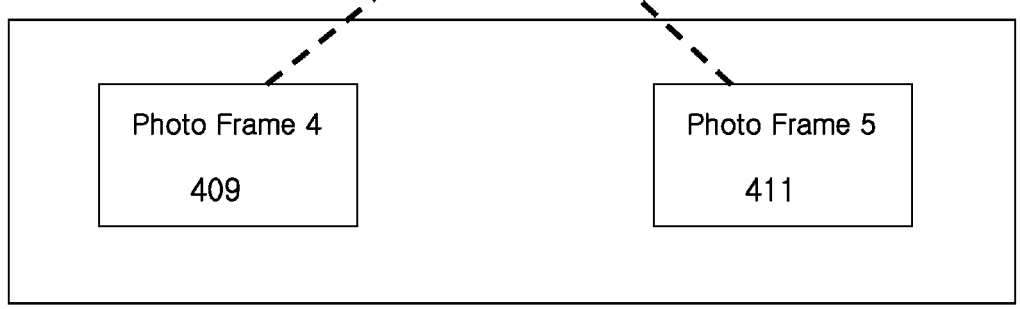

FIG. 4 shows a first advertisement distribution network (400) using a plurality of digital photo frames (403, 405, 407, 409, 411) and an advertising data distribution center (401) in accordance with an embodiment of the invention. In one embodiment of the invention, a first set (413) of digital photo frames (403, 405, 407) is configured to display a first set of advertising materials transmitted by the advertising data distribution center (401), while a second set (415) of digital photo frames (409, 411) is configured to display a second set of advertising materials transmitted by the advertising data distribution center (401).

For example, the first set of advertising materials can be a preview of a children's movie opening in two weeks in local theatres. The advertising data distribution center (401) knows that users in the first set (413) of digital photo frames, namely, Photo Frame 1 (403), Photo Frame 2 (405), and Photo Frame 3 (407), are parents of little children. Therefore, the advertising data distribution center (401) is able to transmit an audience-specific advertising materials (i.e. the preview of the children's movie opening in two weeks) to a multiple number of photo frames in the first set (413) of digital photo frames.

Similarly, for example, the second set of advertising materials can be a new men's cologne advertising campaign sponsored by a cologne producer. The cologne producer requests the advertising data distribution center that its advertising campaign is only to target male users. The advertising data distribution center (401) knows that users in the second set (415) of digital photo frames, namely, Photo Frame 4 (409) and Photo Frame 5 (411), are male users. Therefore, the advertising data distribution center (401) is able to transmit a different audience-specific advertising materials (i.e. the new men's cologne advertising campaign) just for the second set (415) of digital photo frames.

Continuing with FIG. 4, the advertising data distribution center (401) is configured to receive a variety of advertising materials from an advertising agency, a company, or a marketer. In one embodiment of the invention, the advertising data distribution center (401) itself can be part of a service provided by a cellular service provider or any other wireless service provider. The advertising data distribution center (401) can send a new set of advertising materials to a particular photo frame or a group of photo frames.

Figure 5:
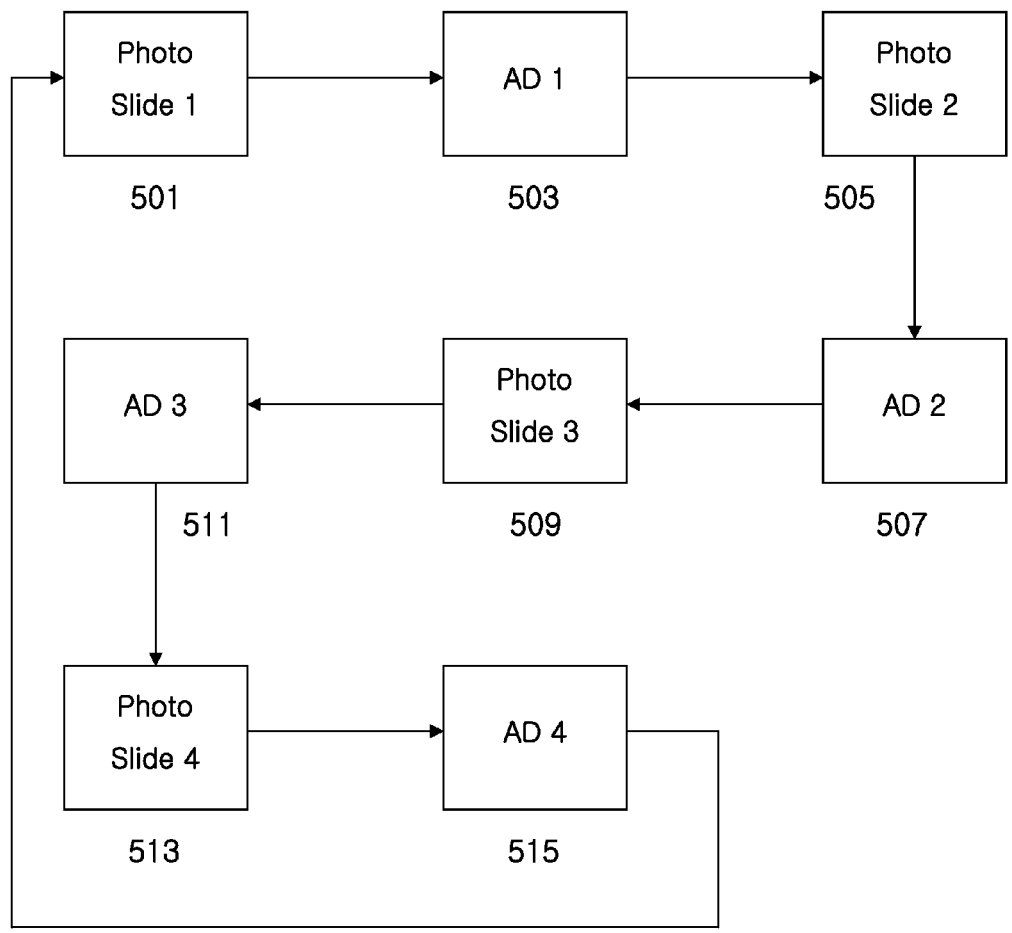
FIG. 5 shows a slide sequence of user-loaded photos and advertisements in accordance with an embodiment of the invention.

FIG. 5 shows a slide sequence (500) of user-loaded photos (501, 505, 509, 513) and advertisements (503, 507, 511, 515) in accordance with an embodiment of the invention. In one embodiment of the invention, most users who accept low-cost or free digital photo frames from a shop or a distributor in accordance with the present invention are going to be notified, most likely in form of a user agreement, that dynamically-updated ads are part of the deal for receiving the low-cost or free digital photo frames because ad sponsors cover a substantial portion of the manufacturing cost of such digital photo frames. Although users will have substantial amount of freedom in utilizing the low-cost or free digital photo frames to upload personal photographs, moving pictures, and data to play them back in their liking in a slideshow, some portion of a typical slideshow sequence will inherently includes some advertising time slots.

The slide sequence (500) of FIG. 5 is one example of intertwining a user's personal photographs in display with necessary amount of advertising per user agreement for a digital photo frame. The first slide (501) in the slide sequence (500) is Photo Slide 1, which is the user's first personal photograph. The second slide (503) in the slide sequence (500) is AD 1, which is a first advertising material which can be a series of photographs, moving pictures, or both. The third slide (505) in the slide sequence (500) is Photo Slide 2, which is the user's second personal photograph. The fourth slide (507) in the slide sequence (500) is AD 2, which is a second advertising material. The fifth slide (509) in the slide sequence (500) is Photo Slide 3, which is the user's third personal photograph. The sixth slide (511) in the slide sequence (500) is AD 3, which is a third advertising material.

The seventh slide (513) in the slide sequence (500) is Photo Slide 4, which is the user's fourth personal photograph. Lastly, the eighth slide (515) in the slide sequence (500) is AD 4, which is a fourth advertising material. This sequence can be repeated starting from the first slide (501).

Figure 6:
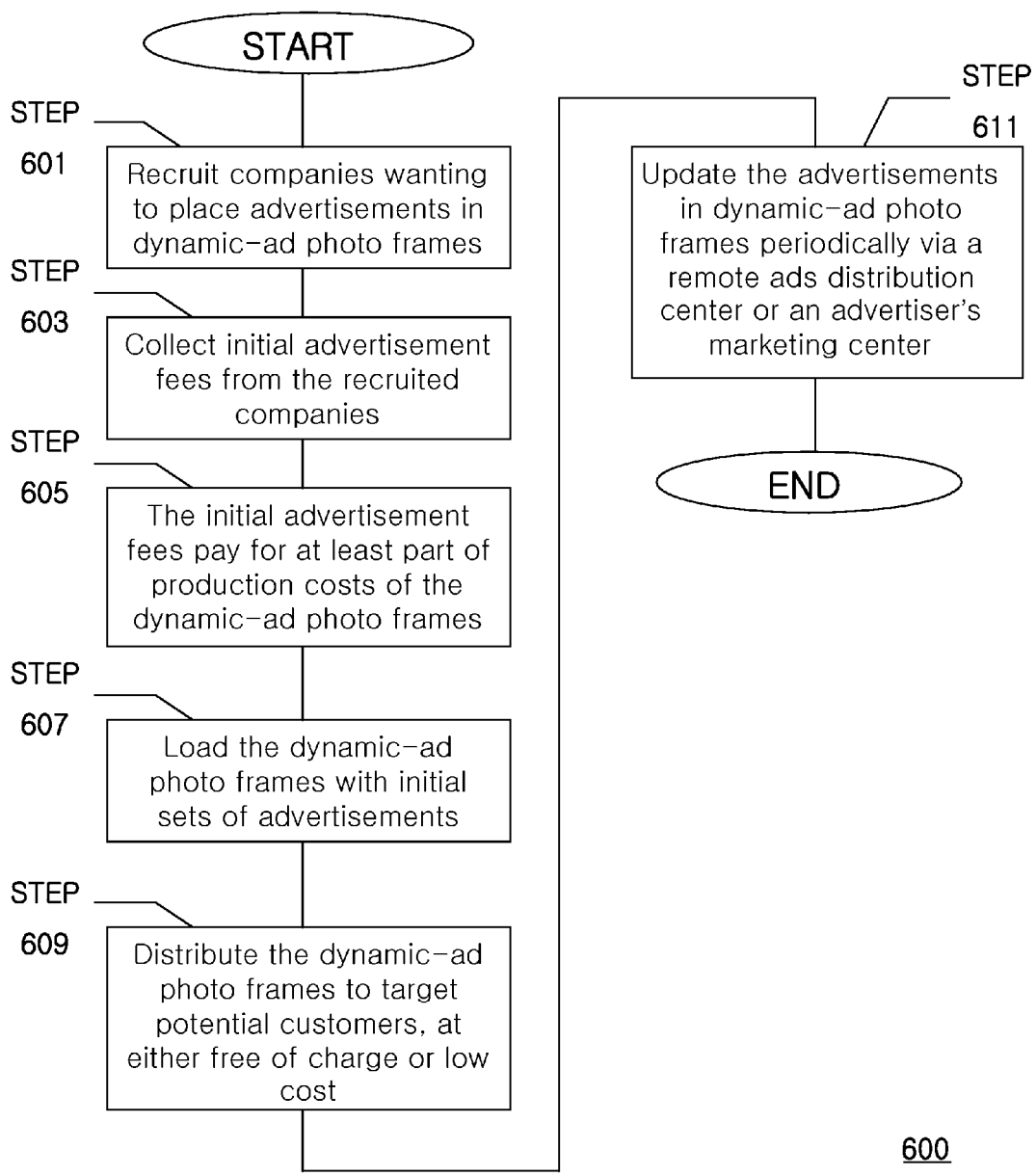
FIG. 6 shows a flowchart for a business method utilizing a plurality of photo frames capable of dynamic advertising updates and an advertising distribution center in accordance with an embodiment of the invention.

FIG. 6 shows a flowchart (600) for a business method of advertising on a digital photo frame with dynamically-updatable-ads in accordance with the invention. The first step of this business method is recruiting a company wanting to place an advertisement in the digital photo frame, as shown in STEP 601. In one embodiment of the invention, the advertisement could be stationary digital photographs, moving pictures, aural sound effects, or any combination thereof.

The second step for the business method of advertising in the digital photo frame is collecting initial advertisement fees from the company wanting to place the advertisement in the digital photo frame, as shown in STEP 603. In one embodiment of the invention, the initial advertisement fees at least partially cover manufacturing and/or distribution cost of the digital photo frame, making the digital photo frame available to a customer free of charge or at a low cost, as shown in STEP 605.

The third step for the business method of advertising in the digital photo frame is loading the digital photo frame with the advertisement for the company, as shown in STEP 607. In one embodiment of the invention, the advertisement is pre-loaded to the digital photo frame before it is distributed to a customer. The advertisement is also dynamically updatable by a remote advertising data distribution center.

The fourth step for the business method of advertising in the digital photo frame is distributing the digital photo frame to a targeted customer who is considered to be a potential purchaser of a service or a product advertised by the company in the digital photo frame, as shown in STEP 609. Some examples of photo frame distributions include a holiday or birthday "gift" to an existing customer in good standing, a souvenir for visiting a store, or a low-cost purchasable item which is generally a fraction of the current market price for a similar digital photo frame without advertising capability.

The fifth step for the business method of advertising in the digital photo frame is updating the advertisement in the photo frame periodically or on-demand via the remote advertising data distribution center, as shown in STEP 611. One major advantage of the present invention is that advertising materials pre-loaded in the digital photo frame can be updated periodically or on-demand by a centralized advertisement distribution entity, which takes new sets of advertisement materials and input from corporate sponsors and advertisers.

Figure 7:
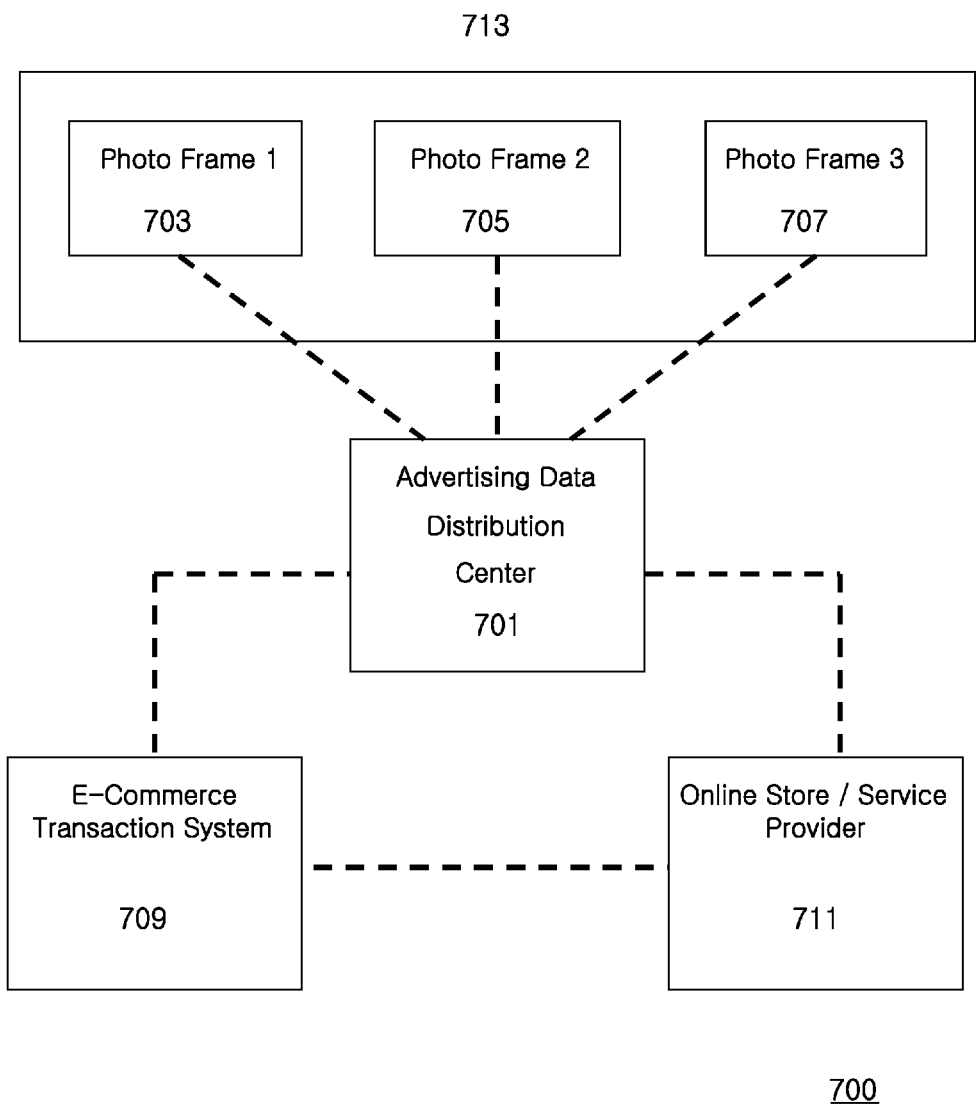
FIG. 7 shows a second advertisement distribution network connecting a plurality of photo frames, an advertising distribution center, an e-commerce transaction system, and an online store/service provider in accordance with an embodiment of the invention.

FIG. 7 shows a second advertisement distribution network (700) connecting a plurality (713) of photo frames (703, 705, 707), an advertising distribution center (701), an e-commerce transaction system (709), and an online store/service provider (711) in accordance with an embodiment of the invention. In one embodiment of the invention, the plurality (713) of photo frames (703, 705, 707) are capable of carrying out e-commerce transaction (e.g. purchase of products or services) with a touch screen display panel in each photo frame and e-commerce enabling software. Similar to the first advertisement distribution network (400) of FIG. 4, the plurality (713) of photo frames (703, 705, 707) is configured to receive advertising updates, replacements, or modifications from the advertising data distribution center (701) in FIG. 7 periodically or on-demand. However, unlike the first advertisement distribution network (400) of FIG. 4, the second advertisement distribution network (700) of FIG. 7 provides a direct monetization method via e-commerce transactions for advertisements placed in the plurality (713) of photo frames (703, 705, 707). In one embodiment of the invention, the e-commerce transaction system (709) and the online store/service provider (711) are part of the Internet operatively connected to the advertising data distribution center (701).

Figure 8:
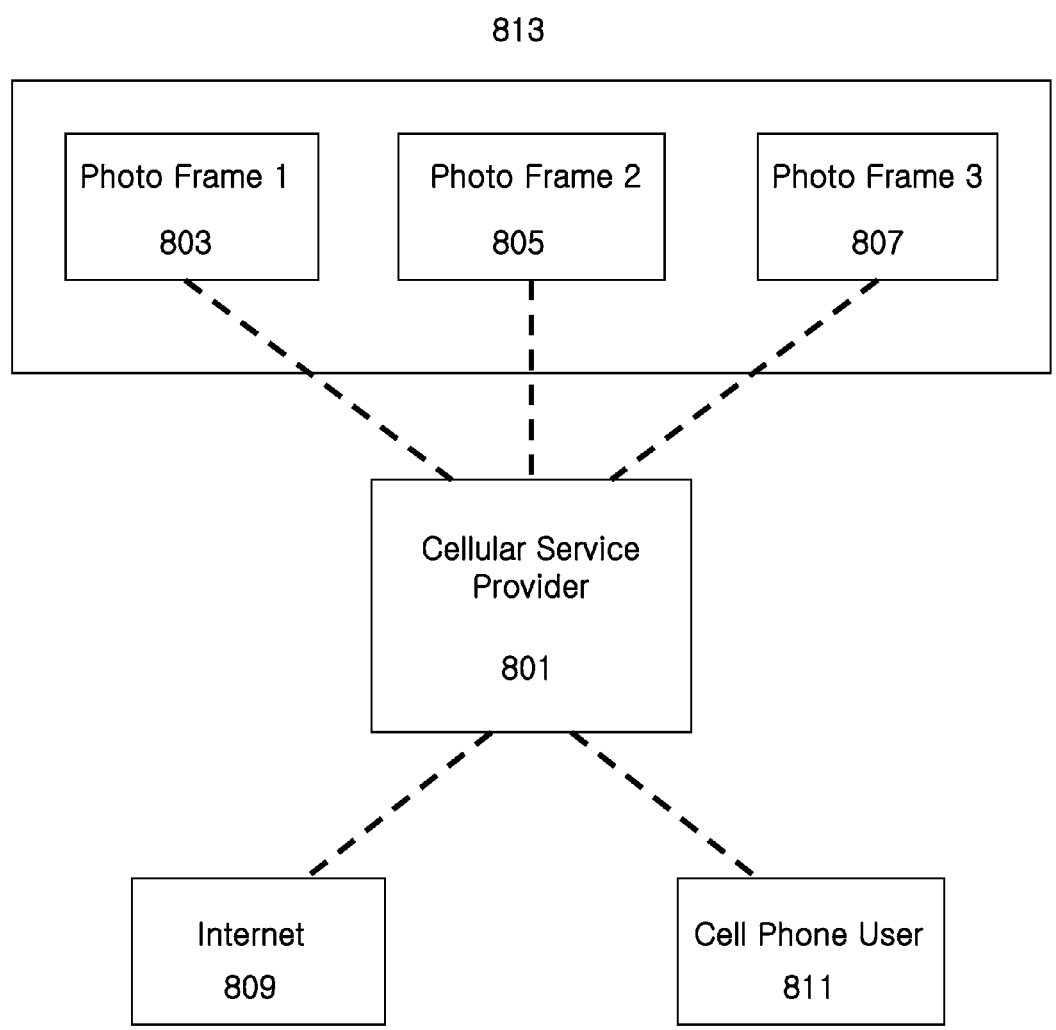
FIG. 8 shows a cellular-service provider communicating with a plurality of photo frames, the Internet, and a cell phone user in accordance with an embodiment of the invention.

FIG. 8 shows a cellular-service provider (801) communicating with a plurality (813) of photo frames (803, 805, 807), the Internet (809), and a cell phone user (811) in accordance with an embodiment of the invention. In one embodiment of the invention, each photo frame in the plurality (813) of photo frames (803, 805, 807) is capable of receiving and transmitting text messages (e.g. SMS) and emails using the cellular service provider (801) to a cell phone user (811) or to an Internet user operatively connected to the Internet (809). In addition, in one embodiment of the invention, some photo frames in the plurality (813) of photo frames (803, 805, 807) can also function as cellular phones operatively connected to the cellular service provider. Furthermore, some photo frames in the plurality (813) of photo frames (803, 805, 807)

are equipped with a camera to record and transmit images to a cell phone user (811) or an Internet user operatively connected to the Internet (809).

As described above, the present invention has multiple advantages over existing advertisement methods such as TV, radio, and the Internet and provide lucrative and unique ways to advertise to consumers for both niche markets and broader segments. While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of advertising on a digital photo frame with dynamically-updatable-ads, the method comprising:
    recruiting a company wanting to place an advertisement in the digital photo frame, wherein the advertisement is configured to present stationary digital photographs, a group of moving pictures, and/or aural information;
    collecting initial advertisement fees from the company, wherein the initial advertisement fees at least partially cover a cost of manufacturing and/or distribution cost of the digital photo frame;
    loading the digital photo frame with the advertisement for the company, wherein the advertisement is dynamically updatable by a service provider computer;
    distributing the digital photo frame to a targeted customer who is considered to be a purchaser of a service or a product advertised by the company in the digital photo frame; and
    updating the advertisement in the photo frame periodically via the service provider computer.

2. The method of claim 1, wherein the service provider computer is associated with the company's marketing department, the company's advertisement agency, or a cellular service provider.

3. The method of claim 1, further comprising a step of uploading personal photos or personal videos by the targeted customer to the digital photo frame.

4. The method of claim 3, further comprising a step of displaying a slide sequence of the personal photos and/or the personal videos by the targeted customer and the advertisement for the company on a display panel of the digital photo frame.

* * * * *